(12) United States Patent
Colbourne et al.

(10) Patent No.: US 6,804,467 B2
(45) Date of Patent: Oct. 12, 2004

(54) CHROMATIC DISPERSION COMPENSATION DEVICE

(75) Inventors: Paul Colbourne, Nepean (CA);
Kuochou Tai, Fremont, CA (US);
Jyehong Chen, San Jose, CA (US);
Kok Wai Chang, Los Altos, CA (US)

(73) Assignees: JDS Uniphase Inc., Ottawa (CA); JDS Uniphase Corporation, San Jose, CA (US)

( * ) Notice: Subject to any disclaimer, the term of this patent is extended or adjusted under 35 U.S.C. 154(b) by 552 days.

(21) Appl. No.: 09/823,971

(22) Filed: Apr. 3, 2001

(65) Prior Publication Data

US 2001/0021053 A1 Sep. 13, 2001

Related U.S. Application Data

(63) Continuation-in-part of application No. 09/702,861, filed on Nov. 1, 2000, and a continuation-in-part of application No. 09/634,707, filed on Aug. 7, 2000, and a continuation-in-part of application No. 09/434,376, filed on Nov. 5, 1999.

(51) Int. Cl.[7] .................. H04J 14/02; H04B 10/00; H04B 10/12
(52) U.S. Cl. .................. 398/159; 398/81; 398/149
(58) Field of Search .................. 398/81, 149, 159, 398/74, 65

(56) References Cited

U.S. PATENT DOCUMENTS

| | | | | | |
|---|---|---|---|---|---|
| 5,557,468 | A | * | 9/1996 | Ip | ............ 359/615 |
| 6,307,988 | B1 | * | 10/2001 | Eggleton et al. | ............ 385/37 |
| 6,317,239 | B1 | * | 11/2001 | Burbidge et al. | ............ 398/160 |
| 6,370,300 | B1 | * | 4/2002 | Eggleton et al. | ............ 385/37 |
| 6,556,320 | B1 | * | 4/2003 | Cao | ............ 398/65 |

FOREIGN PATENT DOCUMENTS

| | | | |
|---|---|---|---|
| EP | 0 732 819 A2 | 9/1996 | ............ H04B/10/18 |
| EP | 0 810 699 A2 | 12/1997 | ............ H01S/3/06 |
| EP | 0 874 489 A2 | 10/1998 | ............ H04J/14/02 |
| EP | 0 933 657 A2 | 8/1999 | ............ G02B/6/293 |

OTHER PUBLICATIONS

European Search Report EP 00 81 1022, Feb. 26, 2001.

* cited by examiner

*Primary Examiner*—Leslie Pascal
*Assistant Examiner*—Dzung Tran
(74) *Attorney, Agent, or Firm*—Lacasse & Associates, LLC; Randy W. Lacasse

(57) ABSTRACT

A method and device is disclosed for dispersion compensation of an optical signal having periodic dispersion within a multi-channels system. For example interleaved optical channels often exhibit dispersion having a characteristic that is repeated in adjacent channels. By providing a periodic device that allows for polarization dependent routing of an interleaved signal to allow for multiple passes of said signal through a multi-cavity GT etalon, having a free-spectral range that corresponds to the channel spacing, the dispersion in the interleaved signal can be lessened and practically obviated or balanced to a desired level. This invention provides a device and method to achieve that end.

22 Claims, 9 Drawing Sheets

CHROMATIC DISPERSION COMPENSATION DEVICE

This application is a continuation-in-part of application Ser. No. 09/434,376 filed Nov. 5, 1999, a continuation-in-part of application Ser. No. 09/634,707 filed Aug. 7, 2000 and a continuation-in-part of application Ser. No. 09/702,861 filed Nov. 1, 2000.

FIELD OF THE INVENTION

This invention relates generally to a device for compensation of chromatic dispersion in optical fiber communication systems and specifically to a multiple pass multi-cavity etalon dispersion compensating device.

BACKGROUND OF THE INVENTION

Most high-speed fiber optic communication systems today use externally modulated lasers to minimize laser 'chirp' and reduce the effects of chromatic dispersion in the fiber. Even with external modulation, there is a certain amount of 'chirp' or broadening of the laser spectrum, because any modulated signal must contain frequency 'sidebands' which are roughly as wide as the modulation rate. Higher bit rate transmission systems consequently have broader frequency sidebands, and at the same time can tolerate less phase delay because of the shorter bit period. Next-generation high bit rate systems are consequently very sensitive to chromatic dispersion of the optical fiber and any components such as WDM's within the system.

Chromatic dispersion of optical fiber is roughly constant over the 1550 nm communication window, and can be compensated by several techniques including dispersion compensating fiber, fiber Bragg gratings, etc. However, certain wavelength filtering components such as WDM's can have significant dispersion characteristics due to a fundamental Kramers-Kronig type relationship between transmission spectrum and dispersion characteristics. This type of dispersion characteristic typically varies substantially over the narrow WDM passband, and therefore is difficult to compensate using conventional techniques such as dispersion compensating fiber. It is one objective of the present invention to compensate for the dispersion from WDM devices, including multiplexers, demultiplexers, and interleavers. Conventional laser systems are known to utilize directly modulated semiconductor lasers. In combination with chromatic dispersion characteristics of single-mode optical fiber, chirping of these lasers contributes to the spread of optical pulses and results in intersymbol interference and overall degradation in transmission. Intersymbol interference in a digital transmission system is the distortion of the received signal by overlap of individual pulses to the degree that the receiver cannot reliably distinguish between groupings of pulses.

Current and "next-generation" high speed systems employ transmitters which use narrow linewidth lasers and external modulators in a window or range of wavelengths about 1550 nm. These external modulators generally have a very low chirp; some designs have a zero or negatively compensating chirp. Nevertheless, transmission distance is still dispersion-limited to about 80 kilometers at transmission rates of 10 Gb/s using conventional single mode fibers.

One solution to this problem is in the use of dispersion shifted fiber which has little dispersion in the 1550 nm window. However, replacing existing fiber with dispersion shifted fiber is costly. Other approaches have been proposed such as optical pulse shaping to reduce laser chirp, using a semiconductor laser amplifier to impose a chirp on the transmitted signal that counteracts the chirping of the directly modulated semiconductor laser.

Approaches that are more consistent with the teachings of this invention attempt to reduce the intersymbol interference at or near the receiver, or intermediate the transmitter and the receiver. Essentially any medium capable of providing a sufficient dispersion opposite to that of the optical fiber can serve as an optical pulse equalizer. For example it is known to use a special optical fiber having an equal chromatic dispersion at a required operating wavelength but opposite in sign to that of the transmitting fiber. Other methods include the use of fiber Bragg gratings, FBGs, as disclosed in U.S. Pat. No. 5,909,295 in the name of Li et al., and disclosed by Shigematsu et al., in U.S. Pat. No. 5,701,188 assigned to Sumitomo Electric Industries, Ltd., and the use of planar lightwave circuit (PLC) delay equalizers. Unfortunately, special compensating fiber has a very high insertion loss and in many applications is not a preferable choice. Fiber gratings are generally not preferred for some field applications due to their narrow bandwidth, and fixed wavelength. PLCs are also narrow band, although tunable devices; fabricating a PLC with large dispersion equalization remains to be difficult. Shigematsu et al. disclose a hybrid of both of these less preferred choices; dispersion compensating fiber with chirped Bragg gratings.

In a paper entitled "Optical Equalization to Combat the Effects of Laser Chirp and Fiber Dispersion" published in the Journal of Lightwave Technology. Vol. 8, No. 5, May 1990, Cimini L. J. et al. describe an optical equalizer capable of combating the effects of laser chirp and fiber chromatic dispersion on high-speed long-haul fiber-optic communications links at 1.55 μm. Also discussed is a control scheme for adaptively positioning the equalizer response frequency. Cimini et al. describe a device having only one common input/output port at a first partially reflective mirror and a second 100% reflective mirror together forming a cavity. The control scheme described attempts to track signal wavelength by obtaining feedback from a receiver. The amplitude response of the equalizer is essentially flat with wavelength at the input/output port, and thus, the proposed control scheme is somewhat complex requiring processing of high speed data at the optical receiver. As well, the proposed control method is stated to function with return to zero, RZ, signals but not with non-return to zero, NRZ, signals, a more commonly used data format. Although the equalizer described by Cimini et al. appears to perform its intended basic dispersion compensating function, there exists a need for an improved method of control of the position of the equalizer frequency response, and as well, there exists a need for an equalizer that will provide a sufficient time shift over a broader range of wavelengths. U.S. Pat. No. 5,023,947 in the name of Cimini et al., further describes this device.

A Fabry-Perot etalon having one substantially fully reflective end face and a partially reflective front face is known as a Gires-Tournois (GT) etalon. In a paper entitled "Multifunction optical filter with a Michelson-Gires-Tournois interferometer for wavelength-division-multiplexed network system applications", by Benjamin B. Dingle and Masayuki Izutsu published 1998, by the Optical Society of America, a device is described which is hereafter termed the MGT device. The MGT device as exemplified in FIG. 1 serves as a narrow band wavelength demultiplexor; this device relies on interfering a reflected E-field with an E-field reflected by a plane mirror 16. The etalon 10 used has a 99.9% reflective back reflector 12r and a front reflector 12f having a reflectivity of about 10%; hence an output signal from only the front reflector 12f is utilized.

In an article entitled "Optical All-Pass Filters for Phase Response Design with Applications for Dispersion Compensation" by C. K. Madsen and G. Lenz, published in *IEEE Photonics Letters*, Vol. 10 No. 7, July 1998, a coupled reflective cavity architecture in optical fiber is described for providing dispersion compensation. Cavities are formed in the optical fiber between fiber Bragg grating reflectors. However a multi-cavity filter in fiber has a limited free spectral range (FSR) insufficient for a telecommunications system. For a typical 100 GHz FSR required in the telecommunications industry, the cavity length is about 1 mm. A Bragg grating reflector, if manufactured using commonly available grating-writing techniques, would need to be longer than 1 mm, and hence the two reflector cavity structure would be too long to achieve the necessary FSR. Another draw back to this prior art solution is the requirement for an expensive optical circulator to separate the input and output signals.

As of late, interleaving/de-interleaving circuits are being used more widely. These specialized multiplexor/demultiplexers serve the function of interleaving channels such that two data streams, for example a first stream consisting of channel 1, 3, 5, 7, and so on, is interleaved, or multiplexed with a second stream of channels, 2, 4, 6, 8, and so on, for forming a single signal consisting of channels 1, 2, 3, 4, 5, 6, 7, 8, and so on. Of course the circuit can be used oppositely, to de-interleave an already interleaved signal, into plural de-interleaved streams of channels. One such interleaver circuit is described in U.S. Pat. No. 6,125,220 issued in the name of Copner et al., and another is in U.S. Pat. No. 6,040,932 issued in the name of Colbourne et al. Although interleaver circuits perform a desired function, it has been discovered that some of these circuits suffer from unwanted periodic chromatic dispersion within each channel. It is this type of periodic dispersion that can be obviated or lessened by the instant invention. It should also be noted that in many instances it is not desirable to completely eliminate all chromatic dispersion; it is believed that a small amount of such dispersion can be useful in reducing non-linear effects in WDM systems; therefore, the instant invention can be used to lessen dispersion by a required amount.

Hence, it is an object of this invention to overcome some of the limitations of the prior art described above. Furthermore, it is an object of the invention to provide a device that will compensate for or lessen dispersion over a plurality of interspaced wavelength channels simultaneously.

SUMMARY OF THE INVENTION

In accordance with the invention, there is provided a dispersion compensation device for compensating a dispersion of an optical input beam, the device comprising:
polarization dependent beam routing means having an input port, for routing a polarized optical beam launched into the input port along a first path in one of two directions in dependence upon the polarization state of the polarized optical beam,
at least one multi-cavity etalon defining at least two resonant cavities, optically coupled to the routing means, said at least one multi-cavity etalon for receiving at least one optical beam from the routing means and for directing at least one reflected optical beam back to the routing means for the reflected light beam to follow a second path in the routing means; and
at least one rotator for rotating the polarization of light in the optical path between the routing block and the etalon so that the at least one reflected light beam follows the second path in the routing means,
whereby the polarized light beam launched into the input port undergoes multiple reflections from the etalon to reduce dispersion of the optical input beam.

The device may also comprise beam directing means, optically coupled to the routing means, for receiving at least one beam from the routing means and for directing at least one beam back to the routing means.

The routing means may be exemplified by a birefringent crystal or by a polarizing beam splitter.

If the input beam is not polarized, a polarization diversity means should be provided to divide the optical input beam into two sub-beams having orthogonal polarizations before the sub-beams are passed into the routing means. After the multiple passes and reflections from the etalon, the two sub-beams may be re-combined to recover the full power of the dispersion-compensated optical beam.

In accordance with the another aspect of the invention, there is provided a dispersion compensation device for compensating a dispersion of an optical input beam comprising:
input beam splitting means for spatially separating the input beam into two orthogonally polarized beams;
first polarization rotating means, optically coupled to the input beam splitting means, said first polarization rotating means for rotating the polarization of one of the two beams such that the two beams have the same polarization;
polarization dependent beam routing means, optically coupled to the first polarization rotating means, said polarization dependent beam routing means for routing the two beams on a first path for the two beams having a first polarization and on a second path for the two beams having a second polarization, orthogonal to the first polarization;
second polarization rotating means, optically coupled to the polarization dependent beam routing means, said second polarization rotating means for rotating the polarization of the two beams such that the two beams have the same polarization;
at least one multi-cavity etalon, optically coupled to the second polarization rotating means, said at least one multi-cavity etalon for receiving the two beams from the second polarization rotating means and for launching the two beams back to the second polarization rotating means, said multi-cavity etalon having at least one end face that is highly reflective and substantially not transmissive to light and at least two other faces that are partly reflective and partly transmissive, the one end face and the at least two other faces being separated from one another by predetermined gaps, the at least three faces forming at least two resonant cavities;
third polarization rotating means, optically coupled to the polarization dependent beam routing means, said third polarization rotating means for rotating the polarization of the two beams such that the two beams have the same polarization;
beam directing means, optically coupled to the third polarization rotating means, said beam directing means for receiving the two beams from the third polarization rotating means and for directing the two beams back to the third polarization rotating means;
fourth polarization rotating means, optically coupled to the polarization dependent beam routing means, said fourth polarization rotating means for rotating the polarization of one of the two beams such that the two beams have orthogonal polarizations; and output beam combining means, optically coupled to the fourth polarization rotating means, said output beam combining means for spatially combining the two orthogonally polarized beams into an output beam;

whereby the two beams undergo multiple passes through the at least one multi-cavity etalon and thereby the dispersion correction of the two beams is increased.

It is understood by those educated in this art that, for example, the splitting and combining means could be birefringent crystals with a walk-off axis orthogonal to the walk-off axis of the routing means which could be another birefringent crystal. Further, the walk-off axes of both of these elements are orthogonal to the optical path through these elements.

In accordance with the another aspect of the invention, there is provided a dispersion compensating system, containing at least two dispersion compensating devices, for compensating an overall dispersion of an optical input beam comprising:

input beam routing means for routing an input beam to a first dispersion compensating device, said first dispersion compensating device comprising:
input beam splitting means for spatially separating the input beam into two orthogonally polarized beams;
first polarization rotating means, optically coupled to the input beam splitting means, said first polarization rotating means for rotating the polarization of one of the two beams such that the two beams have the same polarization;
polarization dependent beam routing means, optically coupled to the first polarization rotating means, said polarization dependent beam routing means for routing the two beams on a first path for the two beams having a first polarization and on a second path for the two beams having a second polarization, orthogonal to the first polarization;
second polarization rotating means, optically coupled to the polarization dependent beam routing means, said second polarization rotating means for rotating the polarization of the two beams such that the two beams have the same polarization;
at least one multi-cavity etalon, optically coupled to the second polarization rotating means, said at least one multi-cavity etalon for receiving the two beams from the second polarization rotating means and for launching the two beams back to the second polarization rotating means, said multi-cavity etalon having at least one end face that is highly reflective and substantially not transmissive to light and at least two other faces that are partly reflective and partly transmissive, the one end face and the at least two other faces being separated from one another by predetermined gaps, the at least three faces forming at least two resonant cavities;
third polarization rotating means, optically coupled to the polarization dependent beam routing means, said third polarization rotating means for rotating the polarization of the two beams such that the two beams have the same polarization;
beam directing means, optically coupled to the third polarization rotating means, said beam directing means for receiving the two beams from the third polarization rotating means and for directing the two beams back to the third polarization rotating means;
fourth polarization rotating means, optically coupled to the polarization dependent beam routing means, said fourth polarization rotating means for rotating the polarization of one of the two beams such that the two beams have orthogonal polarizations;
output beam combining means, optically coupled to the fourth polarization rotating means, said output beam combining means for spatially combining the two orthogonally polarized beams into an output beam;
whereby the two beams undergo multiple passes through the at least one multi-cavity etalon and thereby the dispersion correction of the two beams is increased;

at least one intermediate beam routing means for routing an output beam, of at least a first dispersion compensating device, such that said output beam becomes an input beam of another dispersion compensating device, said another dispersion compensating device comprising:
input beam splitting means for spatially separating the input beam into two orthogonally polarized beams;
first polarization rotating means, optically coupled to the input beam splitting means, said first polarization rotating means for rotating the polarization of one of the two beams such that the two beams have the same polarization;
polarization dependent beam routing means, optically coupled to the first polarization rotating means, said polarization dependent beam routing means for routing the two beams on a first path for the two beams having a first polarization and on a second path for the two beams having a second polarization, orthogonal to the first polarization;
second polarization rotating means, optically coupled to the polarization dependent beam routing means, said second polarization rotating means for rotating the polarization of the two beams such that the two beams have the same polarization;
at least one multi-cavity etalon, optically coupled to the second polarization rotating means, said at least one multi-cavity etalon for receiving the two beams from the second polarization rotating means and for launching the two beams back to the second polarization rotating means, said multi-cavity etalon having at least one end face that is highly reflective and substantially not transmissive to light and at least two other faces that are partly reflective and partly transmissive, the one end face and the at least two other faces being separated from one another by predetermined gaps, the at least three faces forming at least two resonant cavities;
third polarization rotating means, optically coupled to the polarization dependent beam routing means, said third polarization rotating means for rotating the polarization of the two beams such that the two beams have the same polarization;
beam directing means, optically coupled to the third polarization rotating means, said beam directing means for receiving the two beams from the third polarization rotating means and for directing the two beams back to the third polarization rotating means;
fourth polarization rotating means, optically coupled to the polarization dependent beam routing means, said fourth polarization rotating means for rotating the polarization of one of the two beams such that the two beams have orthogonal polarizations;
output beam combining means, optically coupled to the fourth polarization rotating means, said output beam combining means for spatially combining the two orthogonally polarized beams into an output beam; whereby the two beams undergo multiple passes through the at least one multi-cavity etalon and thereby the dispersion correction of the two beams is increased; and output beam routing means, optically coupled to the last dispersion compensating device, said output beam routing means for routing an output beam of the last dispersion compensating device to an output port;

whereby the beam undergoes dispersion correction at each dispersion compensating device that results in balancing the compensation of the overall dispersion of an optical input beam.

An additional embodiment of this invention is provided by a method of dispersion compensation for simultaneously compensating for dispersion present within individual channels in a multi-channel signal, the method comprising:

providing a polarization dependent beam routing and directing means for routing and directing the multi-channel signal in a polarization dependent manner and at least one multi-cavity etalon optically coupled to said polarization dependent beam routing means; and launching a multi-channel signal into said polarization dependent beam routing means to allow for multiple passes through said beam routing means and said multi-cavity etalon, and capturing a dispersion compensated multi-channel signal from said polarization dependent beam routing means.

BRIEF DESCRIPTION OF THE DRAWINGS

Exemplary embodiments of the invention will now be described in conjunction with the drawings in which.

DETAILED DESCRIPTION

The specifications of U.S. application Ser. Nos. 09/434,376; 09/634,707; and 09/702,861 of which the present application is a C-I-P, are being hereby incorporated by reference.

Figure 1:
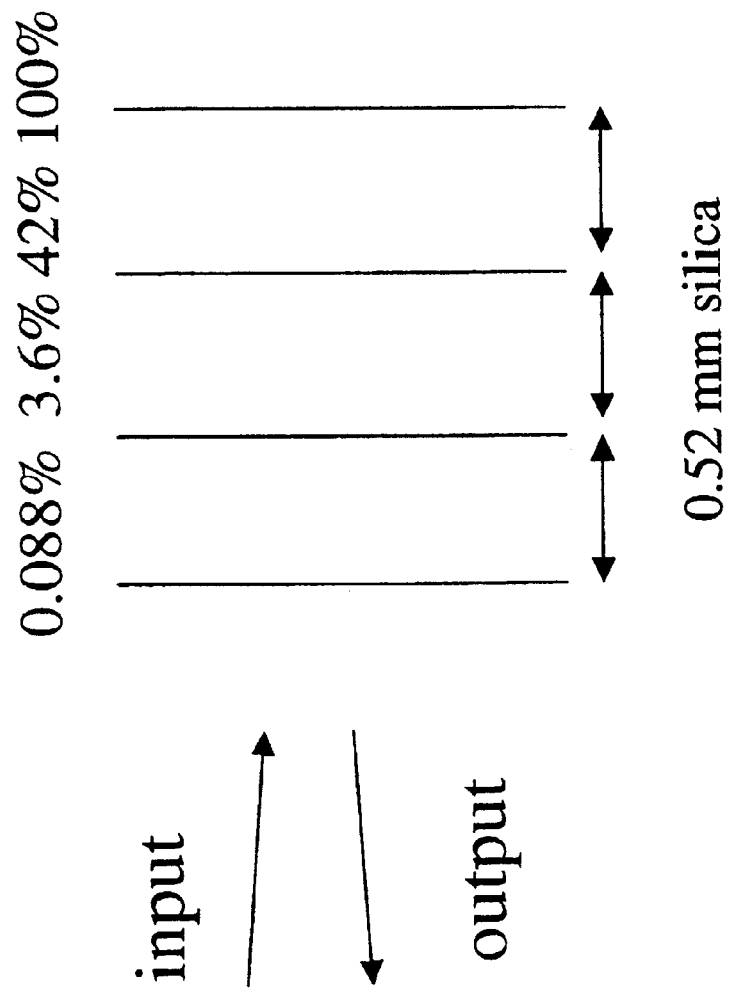
FIG. 1 is a schematic side view of a three-cavity GT etalon tuned to provide dispersion compensation for an output signal provided by an interleaver circuit.
Figure 2:
FIG. 2 is a plot of time delay vs. wavelength for a dispersion compensator.

FIG. 1 shows a side view of a 3-cavity GT etalon tuned to provide dispersion compensation for an output signal from an interleaver circuit. The cavities are made of three blocks of silica providing a predetermined gap of 0.52 mm between reflective end faces. The device has a front input/output face having a reflectivity of 0.088%, a second face with a reflectivity of 3.6%, a third face with reflectivity of 42% and an outward (back) face that is substantially totally reflective having a reflectivity of practically 100%. The periodic nature of time delay versus wavelength is shown in FIG. 2.

Figure 3:
FIG. 3 is a plot of dispersion vs. wavelength for a three-cavity GT etalon dispersion compensator.

FIG. 3 illustrates dispersion vs. wavelength for a 3-cavity GT etalon dispersion compensator, wherein the periodic nature of the dispersion is evident from the plot.

Figure 4:
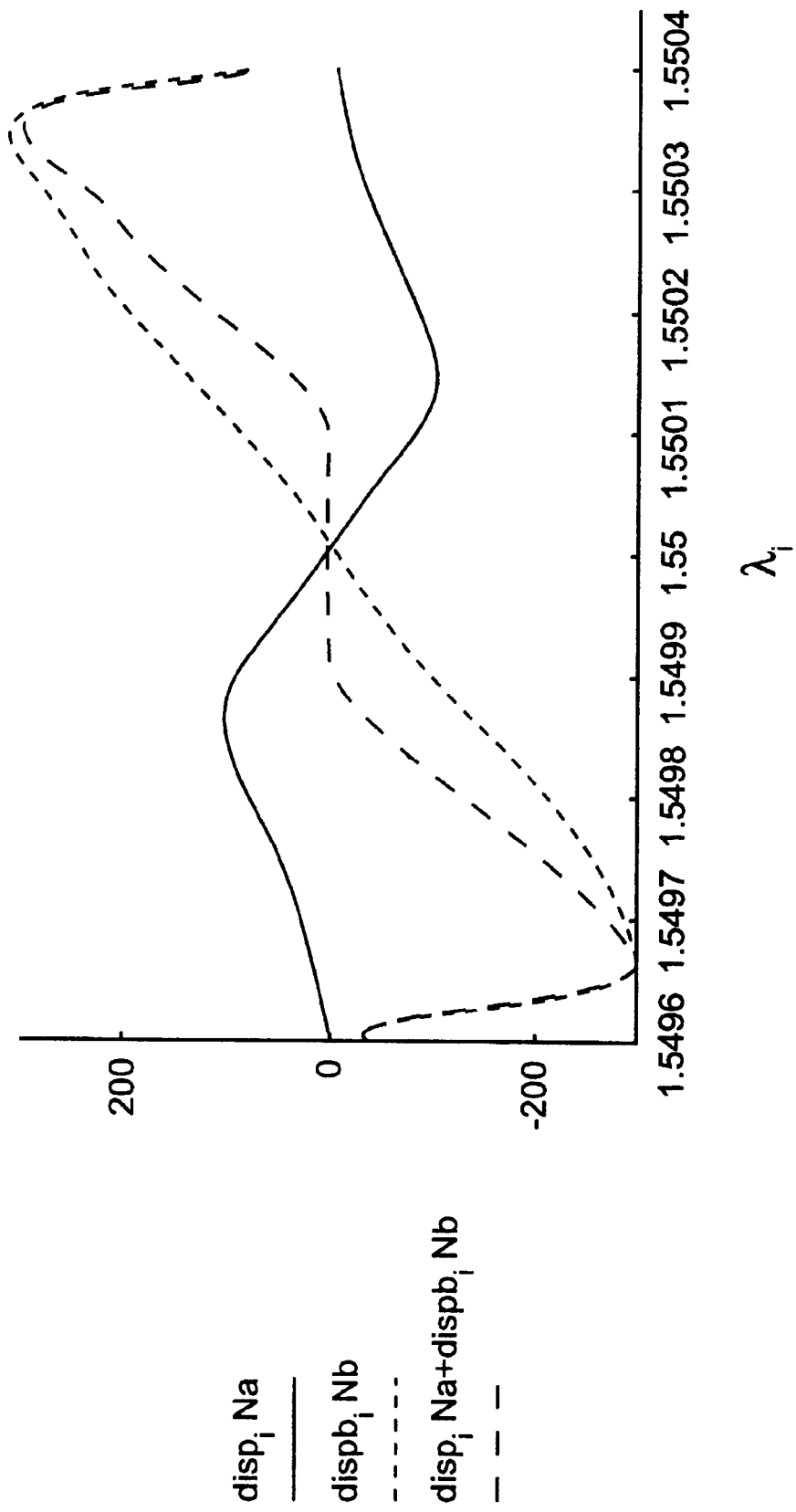
FIG. 4 is an exemplary plot of the dispersion resulting from utilizing two different multi-cavity systems to correct for the dispersion slope.

FIG. 4 is a plot of dispersion resulting from utilizing two different multi-cavity systems to correct for dispersion. As a result, one can obtain a constant dispersion over a wide spectral region. By changing the relative phase of the two systems, one can obtain different dispersion.

The solid line in FIG. 4 is the dispersion from a first multi-cavity etalon, $disp_i N_a$ while the dotted line is the dispersion from a second multi-cavity etalon that does not necessarily have the same number of cavities as in the first multi-cavity etalon. The resulting dispersion after passing through both etalons with a flat line result for $\lambda_i$ 1.5499 to 1.5501 nm is a dashed line. This is an illustration of how the invention allows for the correction of dispersion in an optical fiber. Note that if the second multi-cavity etalon's dispersion characteristic is tuned to a slightly longer wavelength, the resulting dispersion for $\lambda_i$ 1.5499 to 1.5501 nm would be a flat line but with a dispersion value below zero. Similarly, if the second multi-cavity etalon's dispersion characteristic is tuned to a slightly shorter wavelength, the resulting dispersion would be a flat line but with a dispersion value above zero. The use of a multipass system allows for a greater range of change in each multi-cavity etalon since a multipass multi-cavity is a way of amplifying the effect of a single pass through the multi-cavity system. In fact, several multiple pass multi-cavity etalon systems can be cascaded to achieve a still greater range of dispersion effects.

In order to obtain a zero-dispersion (FIG. 4), the channels' central wavelength should correspond. Notwithstanding, this feature can be used as an advantage of the invention. For example, by varying the optical path length between the etalon end faces of the GT dispersion compensator, the etalon's dispersion characteristics can be varied to a slightly higher or lower wavelength. This tuning can be effected by providing a change in temperature to the GT device, for example by providing a heating element adjacent the etalon to heat the block, or conversely by providing cooling to reduce the optical path length. In addition, both can be done simultaneously in the case of a system with two multiple pass multi-cavity etalons where one multiple pass multi-cavity etalon would be heated and the second multiple pass multi-cavity would be cooled. Further to this would be a solution where one multiple pass multi-cavity etalon would be heated or cooled by a greater amount than the second multiple pass multi-cavity etalon. Thus the flat but present dispersion present in the optical fiber within the system can be compensated for by providing a required flat dispersion compensation that is afforded by fine tuning the GT cavity optical path length.

Figures 5, 5A:
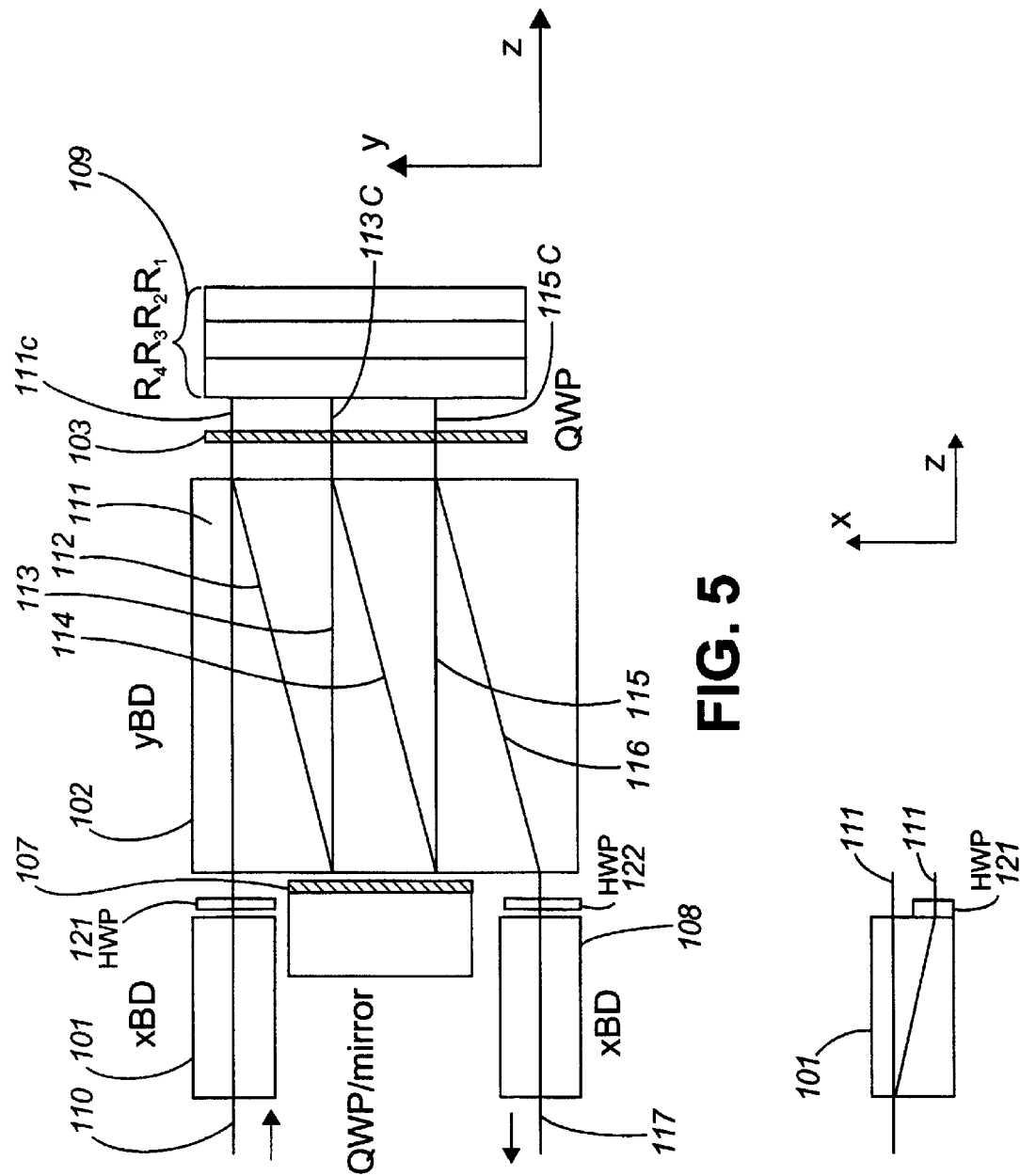
FIG. 5 is a schematic illustration of a dispersion compensator of the invention utilizing a three-cavity etalon and a beam routing block tuned to provide dispersion compensation for an output signal provided by an interleaver circuit.
FIG. 5a is a schematic side view of a polarization diversity (xBD) block of FIG. 5.

FIG. 5a illustrates the functioning of an x-beam displacer 101 to separate the two orthogonally polarized beams vertically and rotate the polarization of one beam using a half waveplate HWP 121 so both beams 111 have the same o polarization. As shown in FIG. 5, the beams 111 then travel straight through a y-beam displacer 102. The beams 111 then pass through a quarter waveplate QWP 103 resulting in a change in polarization to circular. The circular polarized light 111c passes into the multi-cavity etalon 109 and is reflected back and passes through QWP 103 that changes the polarization to extraordinary, e. The e-beams 112 are displaced by y-beam displacer 102 and reflect off of the QWP mirror assembly 107 that changes the polarization of the beams to ordinary, o 113. The o-beams 113 travel straight through y-beam displacer 102, impinge on QWP 103, become circularly polarized 113c and travel into multi-cavity etalon 109 and are reflected back and impinge on QWP 103. The beams undergo a polarization change to become e polarized beams 114. As e-beams 114 pass through element 102 they are displaced by y-beam displacer 102 until the beams impinge QWP mirror assembly 107 that changes the polarization of the beams 115 to o and o-beams 115 travel straight through beam displacer 102 and through QWP 103 changing to circularly polarized light 115c. As before, the beams 115c are reflected by multi-cavity etalon 109 and impinge on QWP 103. QWP 103 changes the polarization of the beams to e 116 which are displaced by y-beam displacer 102 and exit the optical element. One of the e beams is passed through HWP 122 causing a change in polarization to an o beam and then beams 116 are recombined to a single beam by x-beam displacer 108 to form beam 117. These embodiments allow reflecting from the multi-cavity etalon at near-normal incidence reducing degradation of the signal due to insertion loss and the dispersion properties of the etalon.

Figure 6:
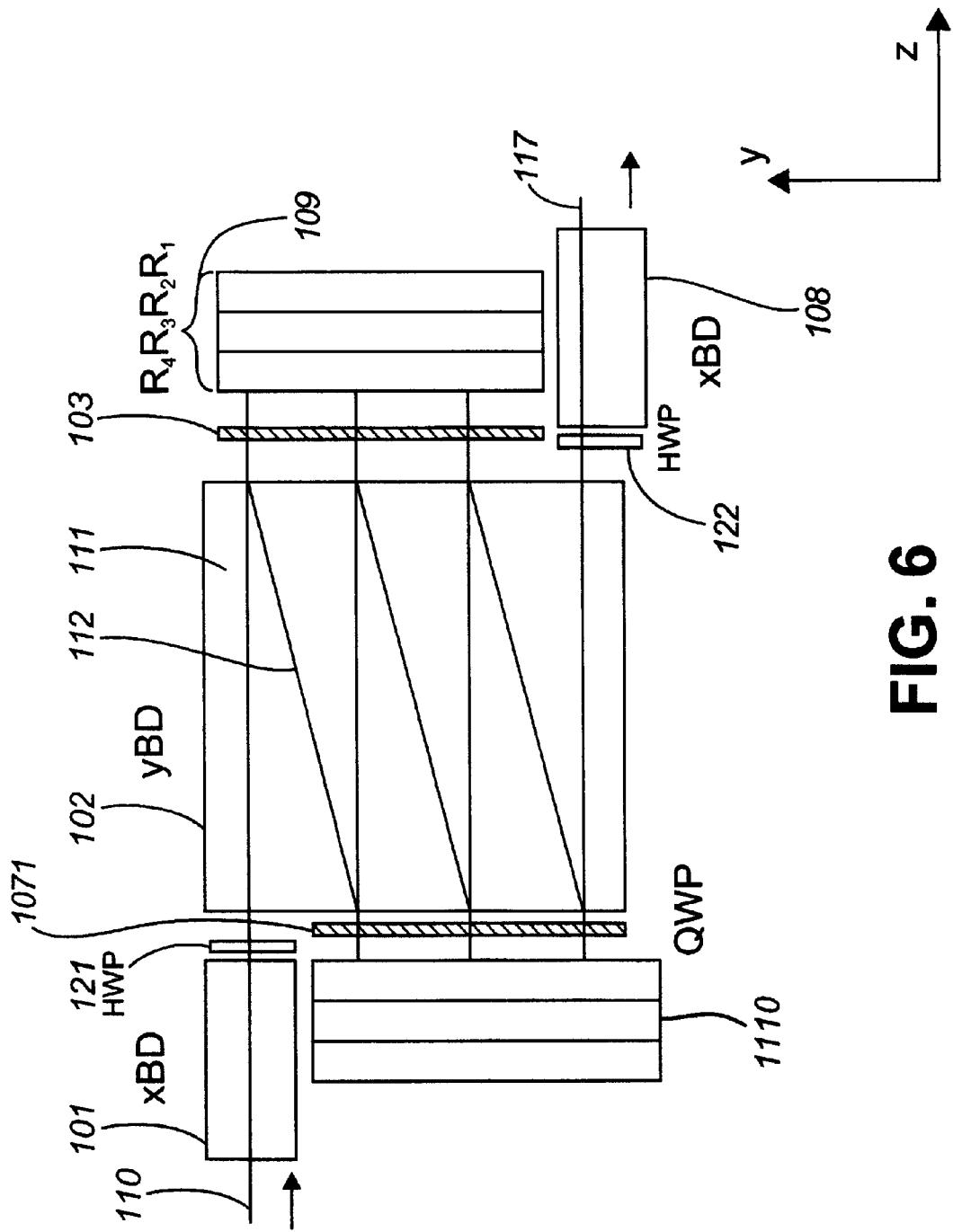
FIG. 6 is a schematic illustration of a dispersion compensator of the invention utilizing two 3-cavity GT etalons in another embodiment of the present invention to provide dispersion compensation for an output signal originated by an interleaver circuit.

Now referring to FIG. 6, in the QWP mirror assembly the mirror has been replaced with an additional multi-cavity etalon 1110. Beams 112 have the same polarization and conditions as in FIG. 5 until after these beams travel through the QWP 1071 becoming circularly polarized, impinge on multi-cavity etalon 1110, are reflected back to QWP 1071 which changes the polarization to o, and then travel straight through y-beam displacer 102. Each time the beams are redirected by the multi-cavity etalon 109 and pass through QWP 103 for the second time, the beams undergo a polarization change to e and y-beam displacer 102 displaces them. Each time the beams are redirected by multi-cavity etalon 1110 and pass through QWP 1071 for the second time the beams undergo a polarization change to o polarization which allows them to travel straight through the y-beam displacer 102. Thus are the beams redirected until they are recombined to a single beam by x-beam recombiner 108 to form beam 117.

Figure 7:
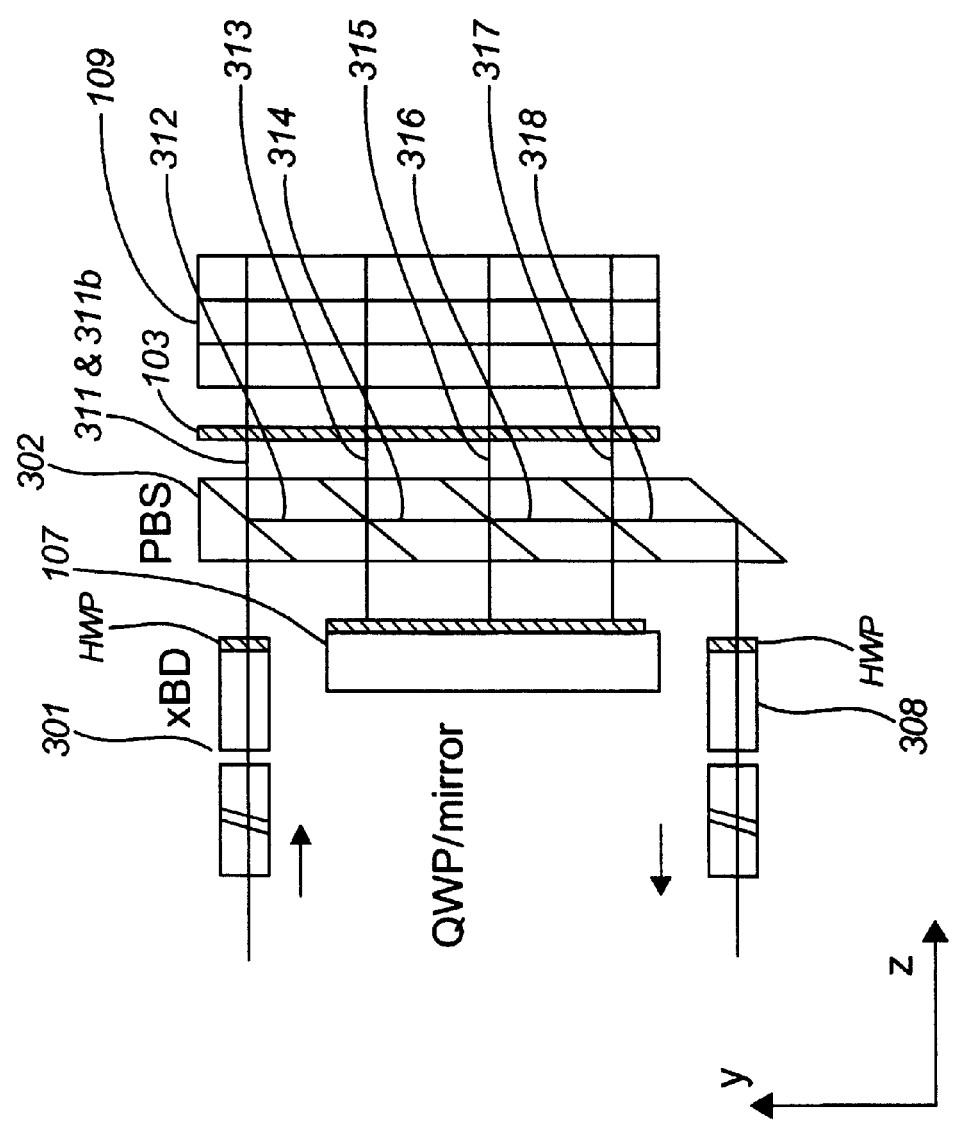
FIG. 7 is a schematic illustration of a dispersion compensator of the invention utilizing a 3-cavity GT etalon in another embodiment of the present invention to provide dispersion compensation for an output signal originated by an interleaver circuit.

Referring to FIG. 7, the beam displacer 102 in FIG. 6 is replaced with a block of polarizing beam splitters PBSs 302. These beam splitters allow o polarized beam to pass straight through and deflect e polarized beams 90 degrees.

The "ordinary" beams 311, 313, 315, and 317, travel through the beam splitters to impinge first on the QWP 103 becoming circularly polarized and then on the multi-cavity etalon 109. The beams that return from the multi-cavity etalon 109 again pass through the QWP 103 to become e polarized beams 312, 314, 316, and 318, and then impinge on the QWP mirror assembly 107. The QWP mirror assembly 107 reflects the beams and changes the polarization to "o" which allows the beams to pass through the PBS. The result is eight reflections from the etalon as each beam 311, 313, 315, 317 is directed twice at the etalon. This process of reflection and transmission occurs until the final stage where the beams of 318 are recombined in x-beam combiner 308. Note that the mirror of the QWP mirror assembly 107 can be replaced with a multi-cavity etalon which may have the same number of cavities as the first multi-cavity etalon, as illustrated in FIG. 6, but does not have to and the invention herein disclosed is not so restricted.

These systems of multiple pass tunable dispersion compensators can be used in combinations to set different dispersion corrections and result in an overall dispersion correction for a set of International Telecommunication Union (ITU) channels. Each separate multipass tunable dispersion compensator etalon system would solve a different dispersion problem. As shown in the illustrations in FIGS. 5, 6, and 7, there is no angle tuning of the individual systems. Rather, each multiple pass tunable compensator allows for the optical beam to enter and leave the etalon normal to the front surface, R4. This reduces ripple loss that is caused by the interaction of beams from the different surfaces when the incident beam is not normal to the front surface. Of course by having multiple passes this ripple loss would be increased on each pass. Therefore, for the multiple pass multi-cavity etalons, having the optical beam at a normal incidence is a requirement to keep losses low. The use of multiple passes through the same multi-cavity etalon allows the dispersion to be corrected without attaining losses due to fiber coupling the etalon at each surface and at each multi-cavity interface. Thus the multiple pass system takes the advantages of the multi-cavity etalon and improves the optical properties further. These systems are still temperature tunable as discussed earlier in this document.

Figure 8:
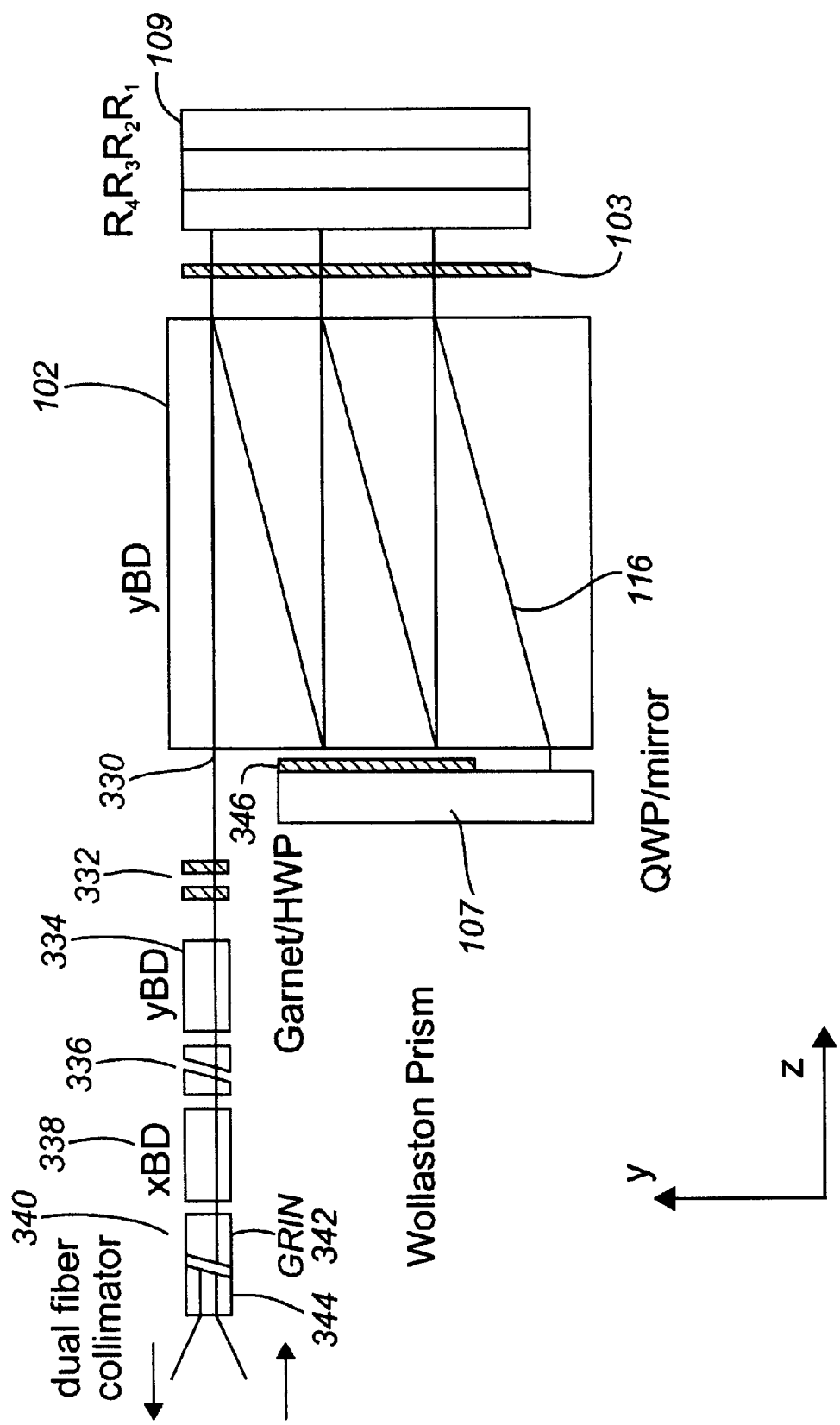
FIG. 8 is a schematic illustration of another embodiment of the device of the invention using a bi-directional input/output.

In the embodiment of FIG. 8, the input and output port 330 of the device is the same and is coupled with a garnet/HWP block 332, a yBD beam displacer 334, a Wollaston prism 336, a beam displacer 338 and a dual-fiber collimator 340 which has a GRIN lens 342 and a two-fiber tube 344. The arrangement 332–344 functions as an isolator so that the single input/output port is sufficient. It will be noted that the mirror 107 extends to reflect the beam 116, but the quarter waveplate 346 does not extend to the same degree. As a result, the beam 116 undergoes a reflection and goes back over the same path to the output port 330.

Figure 9:
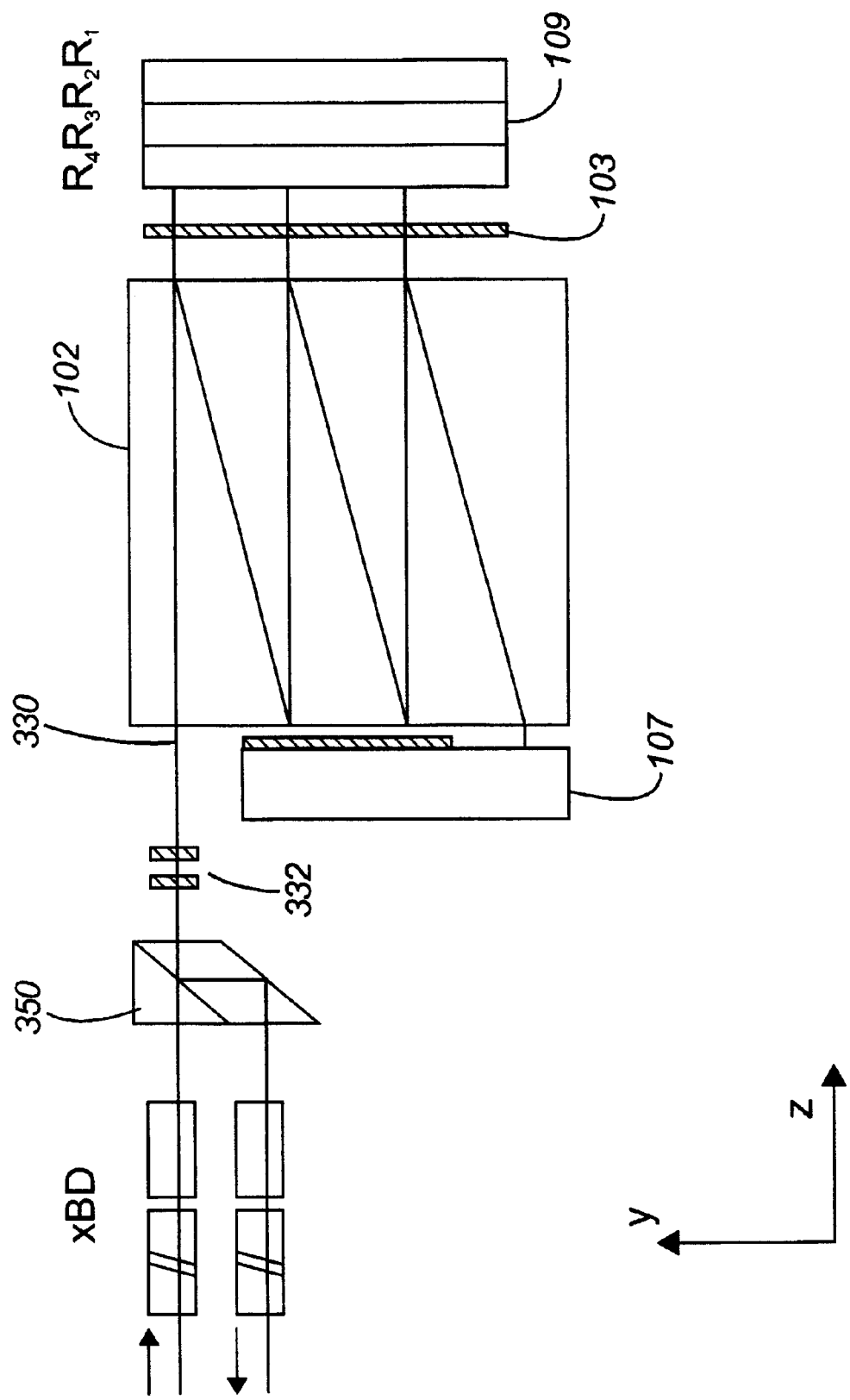
FIG. 9 is a schematic illustration of yet another embodiment of the device of the invention.

In the embodiment of FIG. 9, the device has a circulator that employs, instead of a Wollaston prism as in FIG. 8, a PBS block coupled to collimators and beam displacers on one side and a garnet-HWP unit 332 on the other side. The collimator is coupled to the input/output port 330 as in the embodiment of FIG. 8.

Figure 10:
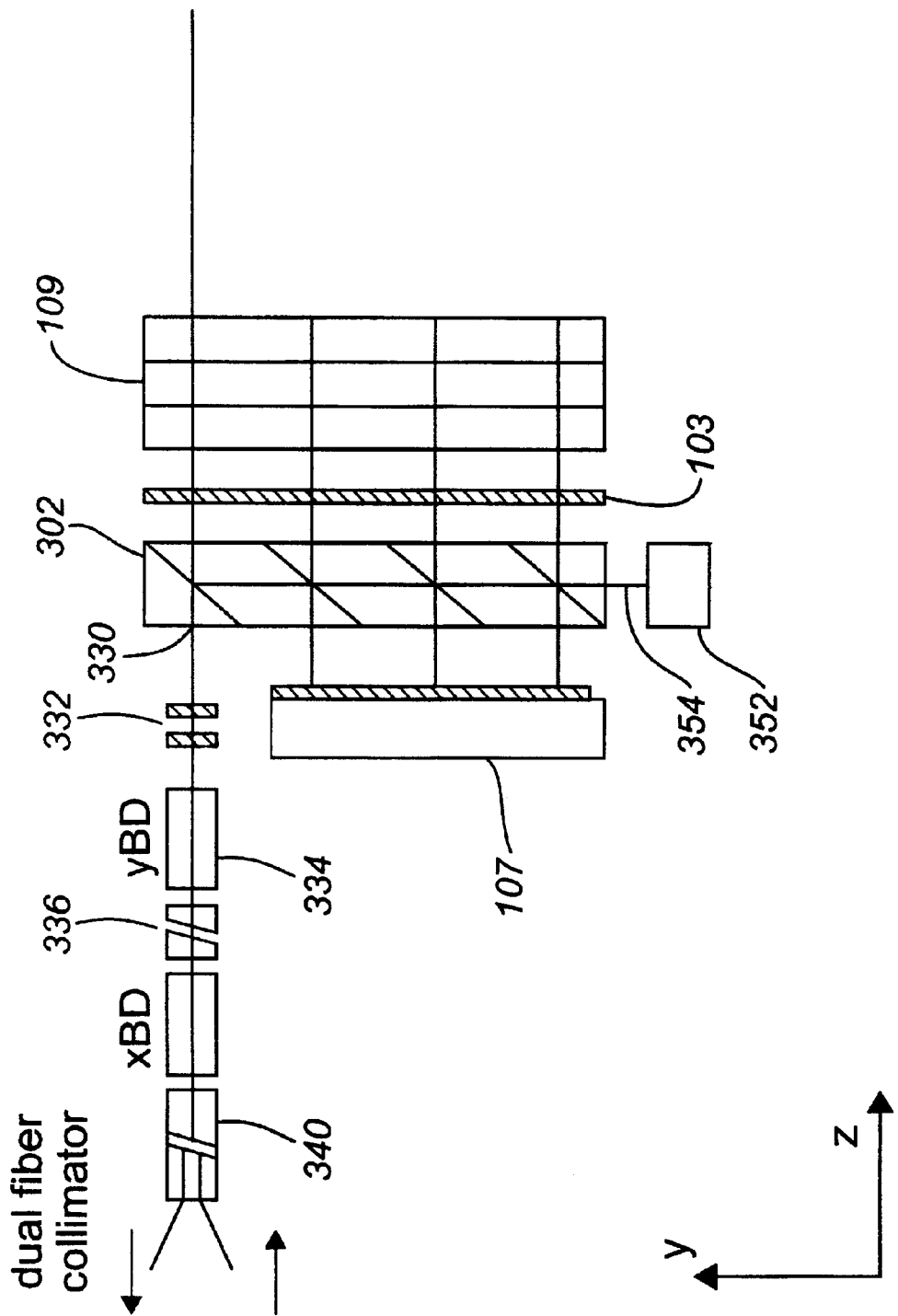
FIG. 10 is a schematic illustration of still another embodiment of the invention using a beam splitter as a routing block.

The arrangement of FIG. 10 has a similar circulator design as the embodiment of FIG. 8. It will be seen, however, that the birefringent routing block 102 of FIGS. 5 and 8 is replaced by a polarizing beam splitter block 302 as in FIG. 7. Because of the need to reroute the input beam from the input/output port 330 through the PBS and back to the input/output port, an additional mirror 352 is disposed in the path of the optical beam 354 exiting the PBS in order to reflect the beam 354 back into the PBS to follow a reverse route with multiple reflections from the etalon. It will be understood that the input beam in the embodiment of FIG. 10 will undergo eight passes through the etalon 109 (four on its way "forward" from the input to the mirror 352 and four on its way "back").

The elements analogous to elements in other embodiments are not mentioned in detail.

Of course numerous other embodiments may be envisaged, without departing from the spirit and scope of the invention herein disclosed.

What is claimed is:

1. A dispersion compensation device for compensating a dispersion of an optical input beam, the device comprising:
    polarization dependent beam routing means having an input port, for routing a polarized optical beam launched into the input port along a first path in one of two directions in dependence upon the polarization state of the polarized optical beam,
    at least one multi-cavity etalon defining at least two resonant cavities, optically coupled to the routing means for receiving at least one optical beam from the routing means and for directing at least one reflected optical beam back to the routing means for the reflected light beam to follow a second path in the routing means; and
    at least one polarization rotator for rotating the polarization of light in the optical path between the routing block and the etalon so that the at least one reflected light beam follows the second path in the routing means,
    whereby the polarized light beam launched into the input port undergoes multiple reflections from the etalon to reduce dispersion of the optical input beam.

2. The device of claim 1 further comprising beam directing means, optically coupled to the routing means, for receiving at least one beam from the routing means and for directing the at least one beam back to the routing means.

3. The device as defined in claim 2, further comprising a second polarization rotator disposed in the optical path between the routing means and the directing means, for rotating the polarization of light beams passing between the routing beams and the directing means.

4. The device as defined in claim 2, wherein the beam directing means is a second multi-cavity etalon.

5. The device of claim 2 wherein the directing means comprises a mirror.

6. The device of claim 1 wherein the routing means comprises a birefringent material.

7. The device of claim 1 wherein the routing means comprises a polarizing beam splitter.

8. The dispersion compensation device as defined in claim 1, wherein the at least one multi-cavity etalon has a free spectral range in the range of 25 GHz to 400 GHz.

9. A dispersion compensation device as defined in claim 8, wherein the free spectral range of at least one cavity of the at least one multi-cavity etalon is equal to or an integer multiple of a channel spacing of the optical input beam or a channel spacing of the optical input beam being an integer multiple of the free spectral range of the at least one cavity of the at least one multi-cavity etalon.

10. A dispersion compensation device as defined in claim 1, further comprising means for tuning the at least one multi-cavity etalon by varying the optical path length of at least one of the cavities of the at least one multi-cavity etalon.

11. A dispersion compensation device as defined in claim 1, further comprising means for tuning the multi-cavity etalon by varying the optical path length of at least one of the cavities of the first multi-cavity etalon by heating or cooling at least one cavity of the first multi-cavity etalon.

12. A dispersion compensation device for compensating a dispersion of an optical input beam, the device comprising:
    a polarization diversity means for splitting an incoming beam of light into two orthogonally polarized sub-beams and for rotating the polarization of at least one of the polarized sub-beams to provide two sub-beams having a same polarization orientation,
    polarization dependent beam routing means having at least one input port, for routing at least one polarized optical sub-beam launched into the input port along a first path in one of two directions in dependence upon the polarization state of the polarized optical sub-beam,
    at least one multi-cavity etalon defining at least two resonant cavities, optically coupled to the routing means for receiving at least one optical sub-beam from the routing means and for directing at least one reflected optical sub-beam back to the routing means for the reflected optical sub-beam to follow a second path in the routing means; and
    at least a first rotator for rotating the polarization of light in the optical path between the routing means and the etalon so that the at least one reflected optical sub-beam follows the second path in the routing means,
    whereby the polarized optical sub-beam launched into the input port undergoes multiple reflections from the etalon to reduce dispersion of the optical input beam.

13. The device of claim 12 wherein said routing means has at least one output port for said at least one optical sub-beam, and polarization diversity means coupled to said output port for recombining optical sub-beams into an output optical beam.

14. The device of claim 13 wherein said output port and the input port are a single port and the device further comprises a circulator coupled to the single port.

15. The device of claim 1 comprising two multi-cavity etalons optically coupled to the routing means whereby the polarized light beam launched into the input port undergoes multiple reflections from both etalons to reduce dispersion of the optical input beam.

16. The device of claim 12 comprising two multi-cavity etalons optically coupled to the routing means for receiving at least one optical sub-beam from the routing means and for directing at least one reflected optical sub-beam back to the routing means for the reflected optical sub-beam to follow a second path in the routing means.

17. A dispersion compensation device as defined in claim 16, wherein the two multi-cavity etalons have the same number of cavities.

18. A dispersion compensation device as defined in claim 16, wherein the two multi-cavity etalons have a different number of cavities.

19. The device as defined in claim 12, wherein the polarization diversity means comprises a walk-off crystal.

20. A dispersion compensation device for compensating a dispersion of an optical input beam comprising:
    input beam splitting means for spatially separating the input beam into two orthogonally polarized beams;
    first polarization rotating means, optically coupled to the input beam splitting means, said first polarization rotating means for rotating the polarization of one of the two beams such that the two beams have the same polarization;
    polarization dependent beam routing means, optically coupled to the first polarization rotating means, said polarization dependent beam routing means for routing the two beams on a first path for the two beams having a first polarization and on a second path for the two beams having a second polarization, orthogonal to the first polarization;

second polarization rotating means, optically coupled to the polarization dependent beam routing means, said second polarization rotating means for rotating the polarization of the two beams such that the two beams have the same polarization;

at least one multi-cavity etalon, optically coupled to the second polarization rotating means, said at least one multi-cavity etalon for receiving the two beams from the second polarization rotating means and for launching the two beams back to the second polarization rotating means, said multi-cavity etalon having at least one end face that is highly reflective and substantially not transmissive to light and at least two other faces that are partly reflective and partly transmissive, the one end face and the at least two other faces being separated from one another by predetermined gaps, the at least three faces forming at least two resonant cavities;

third polarization rotating means, optically coupled to the polarization dependent beam routing means, said third polarization rotating means for rotating the polarization of the two beams such that the two beams have the same polarization;

beam directing means, optically coupled to the third polarization rotating means, said beam directing means for receiving the two beams from the third polarization rotating means and for directing the two beams back to the third polarization rotating means;

fourth polarization rotating means, optically coupled to the polarization dependent beam routing means, said fourth polarization rotating means for rotating the polarization of one of the two beams such that the two beams have orthogonal polarizations; and output beam combining means, optically coupled to the fourth polarization rotating means, said output beam combining means for spatially combining the two orthogonally polarized beams into an output beam;

whereby the two beams undergo multiple passes through the at least one multi-cavity etalon and thereby the dispersion correction of the two beams is increased.

21. A dispersion compensating system, containing at least two dispersion compensating devices, for compensating an overall dispersion of an optical input beam comprising:

input beam routing means for routing an input beam to a first dispersion compensating device, said first dispersion compensating device comprising:

input beam splitting means for spatially separating the input beam into two orthogonally polarized beams;

first polarization rotating means, optically coupled to the input beam splitting means, said first polarization rotating means for rotating the polarization of one of the two beams such that the two beams have the same polarization;

polarization dependent beam routing means, optically coupled to the first polarization rotating means, said polarization dependent beam routing means for routing the two beams on a first path for the two beams having a first polarization and on a second path for the two beams having a second polarization, orthogonal to the first polarization;

second polarization rotating means, optically coupled to the polarization dependent beam routing means, said second polarization rotating means for rotating the polarization of the two beams such that the two beams have the same polarization;

at least one multi-cavity etalon, optically coupled to the second polarization rotating means, said at least one multi-cavity etalon for receiving the two beams from the second polarization rotating means and for launching the two beams back to the second polarization rotating means, said multi-cavity etalon having at least one end face that is highly reflective and substantially not transmissive to light and at least two other faces that are partly reflective and partly transmissive, the one end face and the at least two other faces being separated from one another by predetermined gaps, the at least three faces forming at least two resonant cavities;

third polarization rotating means, optically coupled to the polarization dependent beam routing means, said third polarization rotating means for rotating the polarization of the two beams such that the two beams have the same polarization;

beam directing means, optically coupled to the third polarization rotating means, said beam directing means for receiving the two beams from the third polarization rotating means and for directing the two beams back to the third polarization rotating means;

fourth polarization rotating means, optically coupled to the polarization dependent beam routing means, said fourth polarization rotating means for rotating the polarization of one of the two beams such that the two beams have orthogonal polarizations;

output beam combining means, optically coupled to the fourth polarization rotating means, said output beam combining means for spatially combining the two orthogonally polarized beams into an output beam;

whereby the two beams undergo multiple passes through the at least one multi-cavity etalon and thereby the dispersion correction of the two beams is increased;

at least one intermediate beam routing means for routing an output beam, of at least a first dispersion compensating device, such that said output beam becomes an input beam of another dispersion compensating device, said another dispersion compensating device comprising:

input beam splitting means for spatially separating the input beam into two orthogonally polarized beams;

first polarization rotating means, optically coupled to the input beam splitting means, said first polarization rotating means for rotating the polarization of one of the two beams such that the two beams have the same polarization;

polarization dependent beam routing means, optically coupled to the first polarization rotating means, said polarization dependent beam routing means for routing the two beams on a first path for the two beams having a first polarization and on a second path for the two beams having a second polarization, orthogonal to the first polarization;

second polarization rotating means, optically coupled to the polarization dependent beam routing means, said second polarization rotating means for rotating the polarization of the two beams such that the two beams have the same polarization;

at least one multi-cavity etalon, optically coupled to the second polarization rotating means, said at least one multi-cavity etalon for receiving the two beams from the second polarization rotating means and for launching the two beams back to the second polarization rotating means, said multi-cavity etalon having at least one end face that is highly reflective and substantially not transmissive to light and at least two other faces that are partly reflective and partly transmissive, the one end face and the at least two other faces being separated from one another by predetermined gaps, the at least three faces forming at least two resonant cavities;

third polarization rotating means, optically coupled to the polarization dependent beam routing means, said third polarization rotating means for rotating the polarization of the two beams such that the two beams have the same polarization;

beam directing means, optically coupled to the third polarization rotating means, said beam directing means for receiving the two beams from the third polarization rotating means and for directing the two beams back to the third polarization rotating means;

fourth polarization rotating means, optically coupled to the polarization dependent beam routing means, said fourth polarization rotating means for rotating the polarization of one of the two beams such that the two beams have orthogonal polarizations;

output beam combining means, optically coupled to the fourth polarization rotating means, said output beam combining means for spatially combining the two orthogonally polarized beams into an output beam;

whereby the two beams undergo multiple passes through the at least one multi-cavity etalon and thereby the dispersion correction of the two beams is increased; and output beam routing means, optically coupled to the last dispersion compensating device, said output beam routing means for routing an output beam of the last dispersion compensating device to an output port;

whereby the beam undergoes dispersion correction at each dispersion compensating device that results in balancing the compensation of the overall dispersion of an optical input beam to a predetermined value.

22. A method of dispersion compensation for simultaneously compensating for dispersion present within individual channels in a multi-channel signal, the method comprising:

providing a polarization dependent beam routing and directing means for routing and directing the multi-channel signal in a polarization dependent manner and at least one multi-cavity etalon optically coupled to said polarization dependent beam routing means; and launching a multi-channel signal into said polarization dependent beam routing means to allow for multiple passes through said beam routing means and said multi-cavity etalon, and capturing a dispersion compensated multi-channel signal from said polarization dependent beam routing means.

* * * * *